United States Patent
Razavi Majomard et al.

(10) Patent No.: US 12,155,473 B1
(45) Date of Patent: Nov. 26, 2024

(54) ADAPTIVE TRANSIENT COMPENSATION IN PHYSICAL LAYER TRANSCEIVER

(71) Applicant: Marvell Asia Pte Ltd, Singapore (SG)

(72) Inventors: Seid Alireza Razavi Majomard, Belmont, CA (US); Ehab Tahir, Mississauga (CA)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/322,232

(22) Filed: May 23, 2023

Related U.S. Application Data

(60) Provisional application No. 63/345,935, filed on May 26, 2022.

(51) Int. Cl.
  *H04L 1/00* (2006.01)
  *G06F 1/3296* (2019.01)
  *H04L 5/14* (2006.01)
  *H04L 12/12* (2006.01)

(52) U.S. Cl.
  CPC .......... *H04L 1/0027* (2013.01); *G06F 1/3296* (2013.01); *H04L 5/1461* (2013.01); *H04L 12/12* (2013.01)

(58) Field of Classification Search
  CPC ..... H04L 1/0027; H04L 5/1461; H04L 12/12; G06F 1/3296
  See application file for complete search history.

(56) References Cited

U.S. PATENT DOCUMENTS

2014/0266122 A1* 9/2014 Zhu ................ H02M 3/156
                                                     323/284
2024/0014838 A1* 1/2024 Shaw .................. H04B 15/00

* cited by examiner

*Primary Examiner* — Thien Nguyen

(57) ABSTRACT

A physical layer transceiver (PHY) includes transmit circuitry including digital and analog transmit portions, receive circuitry including digital and analog receive portions, coupling circuitry configured to couple signals from the transmit circuitry onto a transmission medium, and to couple signals off the transmission medium to the receive circuitry, and transient error compensation circuitry coupled to the digital receive portions and to the analog transmit portions, and configured to detect transient error induced in the receive circuitry by the analog transmit portions and to subtract a transient error correction from data in the receive circuitry. The PHY may include asymmetric Energy-Efficient Ethernet (EEE) controller circuitry, and when the transmit circuitry is in the leg operating in EEE low-power-idle mode, the transient error compensation circuitry may detect transient error induced in the receive circuitry of the leg operating in full-data mode and apply a transient error correction.

26 Claims, 5 Drawing Sheets

ADAPTIVE TRANSIENT COMPENSATION IN PHYSICAL LAYER TRANSCEIVER

CROSS REFERENCE TO RELATED APPLICATION

This disclosure claims the benefit of commonly-assigned U.S. Provisional Patent Application Ser. No. 63/345,935, filed May 26, 2022, which is hereby incorporated by reference herein in its entirety.

FIELD OF USE

This disclosure relates to compensation, in a physical layer transceiver, for errors caused by transient signals in a communications channel. More particularly, this disclosure relates to transient error compensation circuitry that filters periodic or otherwise predictable transient signals in a communications channel and also allows shutdown of components that may give rise to periodic or otherwise predictable transient error.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

As an example, communication links operating under the IEEE 802.3 standard, commonly referred to as "Ethernet," may include a feature known as Energy-Efficient Ethernet ("EEE") that allows link partners to save energy, if the physical layer transceivers (PHYs) of both link partners support EEE at the speed at which the link is established.

An EEE link achieves energy savings by having the PHYs enter a low-power-idle (LPI) mode. When a PHY is in LPI mode, the PHY does not transmit or receive regular data signals, but only periodic or otherwise predictable "sleep" and "refresh" (as well as "wake") signals. Each PHY on an EEE link will enter LPI mode after a predetermined interval (the LPI "enter time-out") of inactivity following a "sleep" signal sent by that PHY (to give time for any link-partner PHY that wants to transmit to so do before the first PHY times out and enters LPI mode). When one of the PHYs on a link that is in LPI mode needs to start transmitting, it first transmits a "wake-up" signal, and then waits for a predetermined period (the LPI "exit time-out") to elapse (to give time for the link-partner PHY to also awaken) before it exits from LPI mode and starts transmitting regular data traffic.

Some EEE links may be asymmetric. That is, the two PHYs on a link may be in LPI mode for data traffic in a first direction, but not for data traffic in a second direction. Data traffic in the second direction may continue to flow normally in "full-data" operation. However, the rising and falling edges of the periodic or otherwise predictable refresh signals, as well as any wake-up signals, in the first direction may induce transient errors or interference (referred to informally as "glitches") in the full-data traffic in the second direction.

SUMMARY

In accordance with implementations of the subject matter of this disclosure, a physical layer transceiver includes transmit circuitry including digital transmit portions and analog transmit portions, receive circuitry including digital receive portions and analog receive portions, coupling circuitry configured to couple transmit signals from the transmit circuitry onto a transmission medium, and to couple receive signals off the transmission medium to the receive circuitry, and transient error compensation circuitry coupled to the digital receive portions and to the analog transmit portions, and configured to detect transient error induced in the receive circuitry by the analog transmit portions and to subtract a transient error correction from data in the receive circuitry.

A first implementation of such a physical layer transceiver may further include asymmetric Energy-Efficient Ethernet controller circuitry configured to operate a first one of the transmit circuitry and the receive circuitry in a low-power-idle mode while operating a second one of the transmit circuitry and the receive circuitry in a full-data mode, such that in a link with another such physical layer transceiver on the transmission medium, one leg of the link operates in full-data mode and another leg of the link operates in low-power-idle mode. The transient error compensation circuitry may be coupled to the asymmetric Energy-Efficient Ethernet controller circuitry, to the digital receive portions and to the analog transmit portions, and may be configured to, when the transmit circuitry is in the leg operating in low-power-idle mode, detect transient error induced in the receive circuitry of the leg operating in full-data mode and subtract a transient error correction from data in the receive circuitry.

According to a first aspect of that first implementation, the asymmetric Energy-Efficient Ethernet controller circuitry may be configured to signal to the transient error compensation circuitry when a transient-error-inducing pulse occurs in the leg operating in low-power-idle mode.

According to a second aspect of that first implementation, the asymmetric Energy-Efficient Ethernet controller circuitry may be configured to send a power-off command signal to the analog transmit portions when the transmit circuitry is in the leg operating in low-power-idle mode.

In a first instance of that second aspect, the transient error compensation circuitry may be configured to apply a power-off enable signal to the analog transmit portions, and the analog transmit portions may be configured to power off in response to the power-off command signal only when also receiving the power-off enable signal.

In a second implementation of such a physical layer transceiver, the transient error correction may be determined by the detected transient error.

In a third implementation of such a physical layer transceiver, determination of the transient error correction may be adaptive.

According to a first aspect of that third implementation, determination of the transient error correction may be based on minimizing error power on occurrence of the transient error.

In a fourth implementation of such a physical layer transceiver, the transient error compensation circuitry may be configured to apply a power-off enable signal to the analog transmit portions.

According to implementations of the subject matter of this disclosure, a method, in a network link, of cancelling transient error in a first leg of the network link caused by pulses in a second leg of the network link, includes detecting transient error induced in receive circuitry of the first leg caused by transient pulses in the second leg, and subtracting a transient error correction from data in the receive circuitry.

A first implementation of such a method may further include, when the network link is an asymmetric Energy-Efficient Ethernet link controlled by controller circuitry, the first leg is a full-data-mode leg of the asymmetric Energy-Efficient Ethernet link, and the second leg is operating in low-power-idle mode, signaling by the controller circuitry that a transient-error-inducing pulse is occurring, to enable the detecting of the transient error.

A first aspect of that first implementation may further include powering off analog transmit portions of the leg operating in low-power-idle mode.

A second implementation of such a method may further include determining the transient error correction from the detected transient error.

A third implementation of such a method may further include determining the transient error correction adaptively.

According to a first aspect of that third implementation, determining the transient error correction adaptively may include minimizing error power on occurrence of the transient error.

A fourth implementation of such a method may further include powering off analog transmit portions of the second leg.

According to a first aspect of that fourth implementation, powering off analog transmit portions of the leg operating in low-power-idle mode may be performed only when transient error compensation circuitry is present.

According to implementations of the subject matter of this disclosure, a network link includes a transmission medium, a first physical layer transceiver at a first end of the transmission medium, the first physical layer transceiver including first transmit circuitry including first digital transmit portions and first analog transmit portions, first receive circuitry including first digital receive portions and first analog receive portions, first coupling circuitry configured to couple first transmit signals from the first transmit circuitry onto the transmission medium, and to couple first receive signals off the transmission medium to the first receive circuitry, and first transient error compensation circuitry coupled to the first digital receive portions and to the first analog transmit portions, and configured to detect a first transient error induced in the first receive circuitry subtract a first transient error correction from data in the first receive circuitry, and a second physical layer transceiver at a second end of the transmission medium, the second physical layer transceiver including second transmit circuitry including second digital transmit portions and second analog transmit portions, second receive circuitry including second digital receive portions and second analog receive portions, second coupling circuitry configured to couple second transmit signals from the second transmit circuitry onto the transmission medium, and to couple second receive signals off the transmission medium to the second receive circuitry, and second transient error compensation circuitry coupled to the second digital receive portions and to the second analog transmit portions, and configured to detect a second transient error induced in the second receive circuitry of the leg operating in full-data mode and subtract a second transient error correction from data in the second receive circuitry.

In a first implementation of such a network link, the network link may be an Energy-Efficient Ethernet link, the first physical layer transceiver may further include first asymmetric Energy-Efficient Ethernet controller circuitry configured to operate one of (a) the first transmit circuitry, and (b) the first receive circuitry, in a low-power-idle mode while operating another one of (a) the first transmit circuitry, and (b) the first receive circuitry, in a full-data mode, the second physical layer transceiver may further include second asymmetric Energy-Efficient Ethernet controller circuitry configured to operate one of (i) the second transmit circuitry, and (ii) the second receive circuitry, in a low-power-idle mode while operating another one of (i) the second transmit circuitry, and (ii) the second receive circuitry, in a full-data mode, and the second error compensation circuitry may be coupled to second asymmetric Energy-Efficient Ethernet controller circuitry configured to operate one of (i) the second receive circuitry, and (ii) the second transmit circuitry, in the low-power-idle mode while operating another one of (i) the second receive circuitry, and (ii) the second transmit circuitry, in the full-data mode. One leg of the Energy-Efficient Ethernet link on the transmission medium between the first physical layer transceiver and the second physical layer transceiver may operate in full-data mode and another leg of the link may operate in low-power-idle mode.

According to a first aspect of that first implementation, the first asymmetric Energy-Efficient Ethernet controller circuitry may be configured to signal to the first transient error compensation circuitry when a transient-error-inducing pulse occurs in the first transmit circuitry in the leg operating in low-power-idle mode, and the second asymmetric Energy-Efficient Ethernet controller circuitry may be configured to signal to the second transient error compensation circuitry when a transient-error-inducing pulse occurs in the second transmit circuitry in the leg operating in low-power-idle mode.

According to a second aspect of that first implementation, the first asymmetric Energy-Efficient Ethernet controller circuitry may be configured to send a power-off command signal to the first analog transmit portions when the first transmit circuitry is in the leg operating in low-power-idle mode, and the second asymmetric Energy-Efficient Ethernet controller circuitry may be configured to send a power-off command signal to the second analog transmit portions when the second transmit circuitry is in the leg operating in low-power-idle mode.

In a first instance of that second aspect, the first transient error compensation circuitry may be configured to apply a power-off enable signal to the first analog transmit portions, the first analog transmit portions may be configured to power off in response to the power-off command signal only when also receiving the power-down enable signal, the second transient error compensation circuitry may be configured to apply a power-off enable signal to the second analog transmit portions, and the second analog transmit portions may be configured to power off in response to the power-off command signal only when also receiving the power-down enable signal.

In a second implementation of such a network link, the transient error correction may be determined by the detected transient error.

In a third implementation of such a network link, determination of the transient error correction may be adaptive.

According to a first aspect of that third implementation, determination of the transient error correction may be based on minimizing error power on occurrence of the transient error.

In a fourth implementation of such a network link, the first transient error compensation circuitry may be configured to apply a power-off signal to the first analog transmit portions, and the second transient error compensation circuitry may be configured to apply a power-off signal to the second analog transmit portions.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
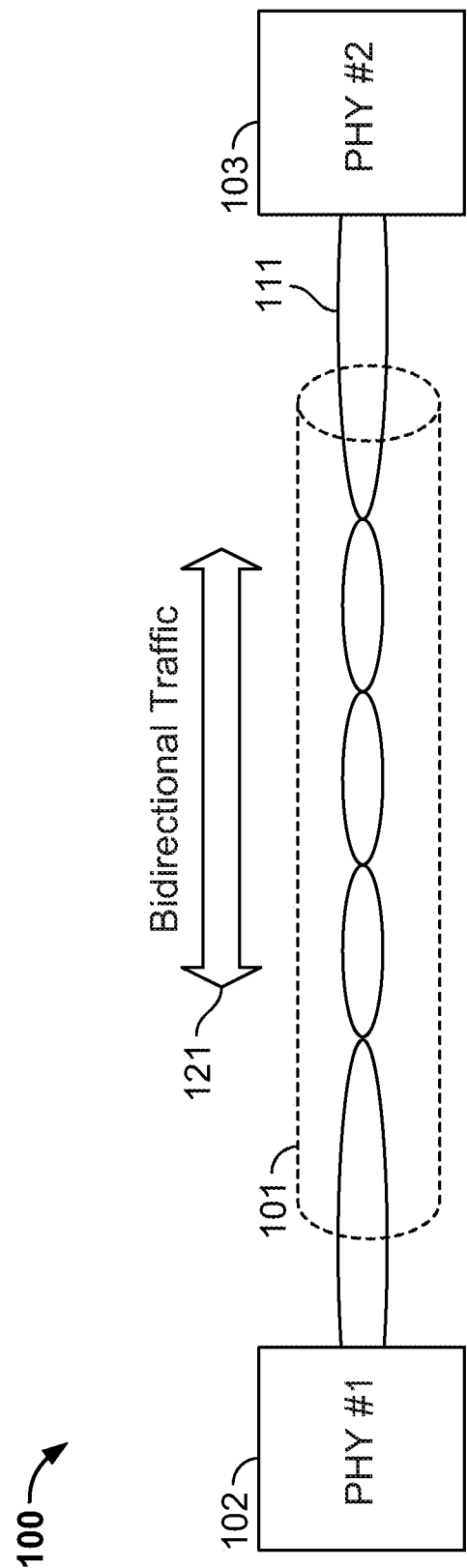
FIG. 1 shows an Energy-Efficient Ethernet link with which implementations of the subject matter of this disclosure may be used.

Bidirectional network communication links may be subject to periodic or predictable transient interference on one leg of the link in a first direction resulting from signals on another leg of the link in a second direction. As one example for purposes of discussion, and without limitation, as noted above, some EEE links may be asymmetric. That is, the two PHYs on a link may be in LPI mode for data traffic in a first direction, but not for data traffic in a second direction. Data traffic in the second direction may continue to flow normally in full-data operation. However, the rising and falling edges of the periodic refresh signals, as well as any wake-up signals, in the first direction may induce transient errors or interference in the full-data traffic in the second direction.

Moreover, in the particular case of EEE link, while the link direction that is in LPI mode may save power by not transmitting signals, analog components in that channel nevertheless typically remain powered ON because of the greater interference in the full-data direction that would be caused by powering those analog components ON and OFF.

Thus, a typical asymmetric EEE link causes interference in the full-data direction of the link while not achieving all of the potential power savings that might be available. This may be of particular concern in applications such as automotive Ethernet, where error-free communications, as well as power savings, are of high importance, but also is of concern in asymmetric EEE applications generally. In addition, there may be other situations, besides interference on an EEE leg caused by another EEE leg in LPI mode, where transient signals on one leg of a bidirectional network link may cause periodic or otherwise predictable interference on another leg of the bidirectional network link.

Therefore, in accordance with implementations of the subject matter of this disclosure, a PHY, which as one example may be an EEE-enabled PHY, includes transient error compensation circuitry that filters, from one data path, transient errors or interference caused signals in other data path, where the transient interference-causing signals may be predictable or where the timing of occurrence of such signals may be communicated to the PHY. In the asymmetric EEE mode, the transient error compensation circuitry may filter, from the full-data path, any periodic or otherwise predictable transient errors or interference caused by refresh or wake-up signals in the LPI path. In addition, the transient error compensation circuitry also may be able to compensate for the larger transient signals caused by more complete shutdown of the analog components in one of the paths, allowing, for example, in the LPI path of an asymmetric EEE link, those analog components to be partially or completely shut down in LPI mode. Thus, an EEE-enabled PHY incorporating transient error compensation circuitry according to this disclosure not only is able to mitigate transient signal interference, but also can save more power in LPI mode than a typical EEE-enabled PHY in LPI mode because of the ability to shut down components.

The subject matter of this disclosure may be better understood by reference to FIGS. 1-6.

Any individual link 100 to which the subject matter of this disclosure may apply may have the structure shown in FIG. 1. A channel medium 101, which may be a shielded or unshielded twisted wire pair 111, or may be a coaxial or fiber cable (not shown), carries bidirectional traffic 121 between two link partners, each of which includes a PHY 102, 103, described in relevant detail below.

Figure 2:
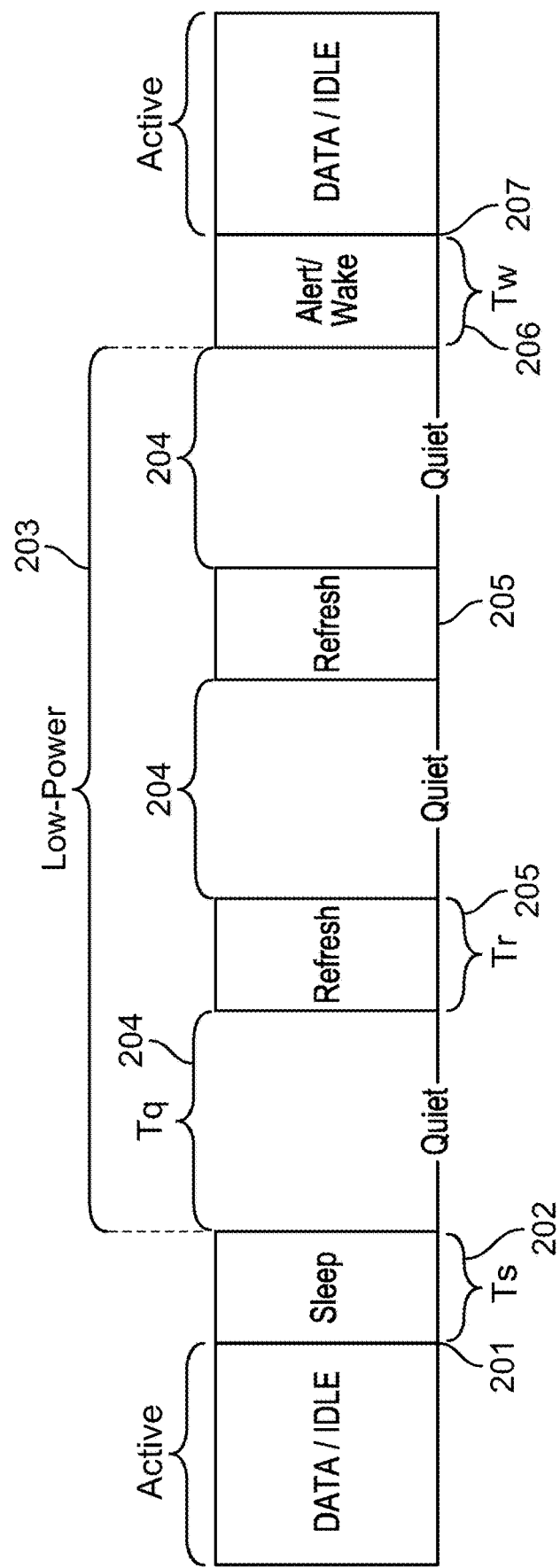
FIG. 2 illustrates operation of an Energy-Efficient Ethernet link.
Figure 3:
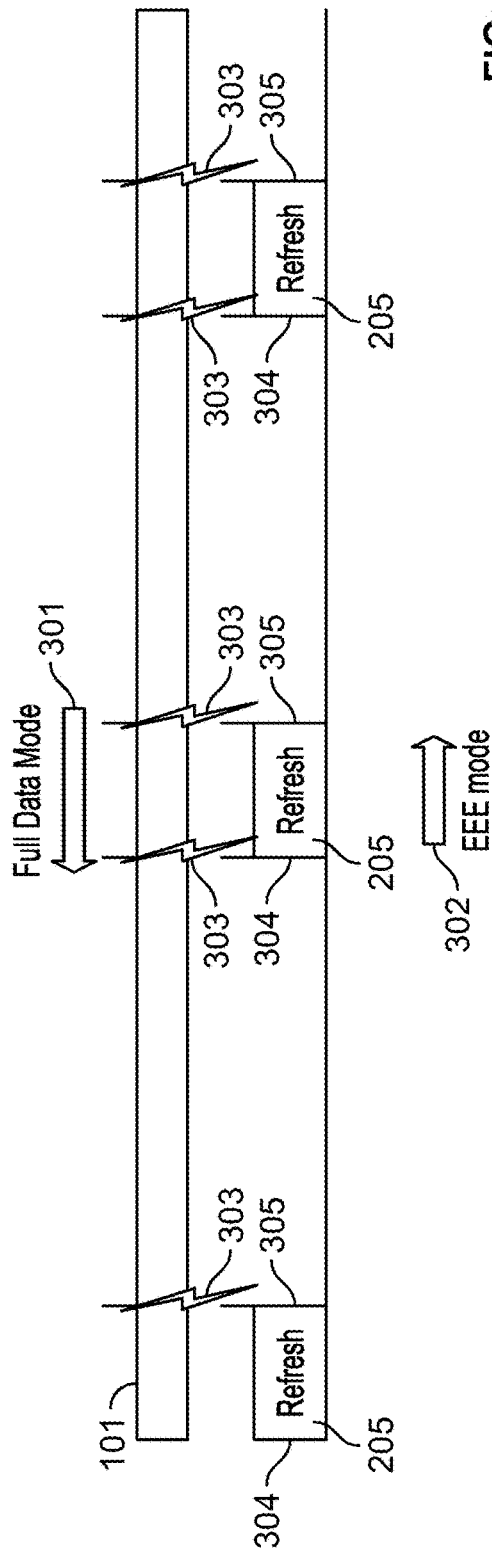
FIG. 3 shows how operation of an Energy-Efficient Ethernet link generates transient errors in the full-data-mode path.

Typical EEE behavior, as one example of an environment in which the subject matter of this disclosure may be used, is illustrated in FIG. 2. Up to time 201, a channel may be active, with data pulses, possibly interspersed with idle periods, being transmitted normally along respective link paths in either direction. If LPI mode is triggered on a particular link path at time 201, the PHY in which LPI mode is triggered issues a sleep signal 202 for a duration $T_s$, advising that PHY's link partner that the PHY is about to enter LPI mode (and giving the link partner time to respond—e.g., by sending data to prevent entry into LPI mode). The link will then enter a period 203 of quiet intervals 204 each of duration $T_q$, separated by refresh intervals 205 each of duration $T_r$. The interval durations are not illustrated to scale in FIG. 2. For example, $T_q$ is typically about 95 times as long as $T_r$ (e.g., 30.4 μs vs. 320 ns for a 10GBASE-T1 channel), while $T_s$ is typically about 2.56 μs for a 10GBASE-T1 channel. When LPI mode is about to end, the PHY sends, during alert/wake interval 206 of duration $T_w$, an "alert" pulse (of duration 1.28 μs in 10GBASE-T1) followed by a "wake" pulse (of duration 2.56 μs in 10GBASE-T1), signaling to its link partner that the link partner should be prepared to resume normal operations at time 207. Although only three quiet intervals 204 and corresponding refresh intervals 205 are shown during LPI period 203, typically there will be hundreds or thousands of quiet intervals 204 and refresh intervals 205 in any LPI period 203.

During each refresh interval 205, the PHY wakes up sufficiently to measure the channel and adapt equalizer filters, echo cancellers, and/or timing recovery circuits such as CDR (none shown). However, where the link is asymmetric, having one leg 301 (FIG. 3) operating in full-data mode while another leg 302 operates in EEE mode, each of the hundreds or thousands of refresh intervals 205 provides another opportunity for a transient event 303 on any rising edge 304 or falling edge 305 of refresh interval 205, and every transient event 303 presents the possibility of interference with full-data path 301.

Figure 4:
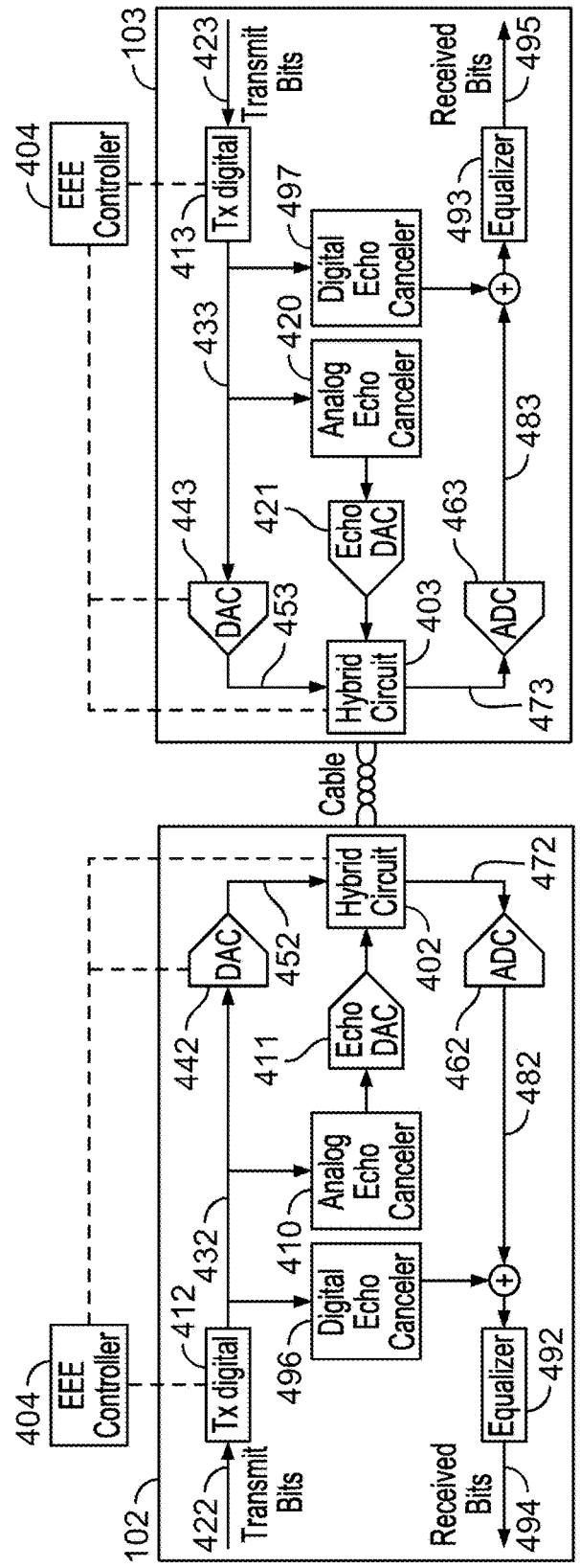
FIG. 4 is a schematic representation of a physical layer transceiver which may be modified in accordance with implementations of the subject matter of this disclosure.

PHYs 102, 103 may typically have structures such as shown in FIG. 4. PHY 102 includes, in its transmit path, a digital transmitter circuit 412 for processing transmit bits 422 from a functional circuit (not shown) to provide digitized transmit signals 432. Digital-to-analog converter (DAC) 442 is configured to convert the digitized transmit signals 432 to analog signals 452 for propagation onto channel medium 101 by hybrid coupler and transformer circuit 402.

On the receive side, PHY 102 includes an analog-to-digital converter 462 configured to receive analog signals 472 from channel medium 101 via hybrid coupler and transformer circuit 402 and convert analog signals 472 to digitized received signals 482, and equalizer/decoder circuitry 492 to convert digitized received signals 482 to digital received bits 494 which are propagated to the functional circuit. Digital echo cancellation circuitry 496 is configured to detect in digitized received signals 482 any traces of digitized transmit signals 432 that may be present in digitized received signals 482 and to subtract out from digitized received signals 482 those traces of digitized transmit signals 432. Digital echo cancellation circuitry 496 may be supplemented by analog echo cancellation circuitry including a digital portion 410, which can be optimized to reduce the echo, and an echo DAC 411.

Similarly, PHY 103 includes, in its transmit path, a digital transmitter circuit 413 for processing transmit bits 423 from a functional circuit (not shown) to provide digitized transmit signals 433. Digital-to-analog converter (DAC) 443 is configured to convert the digitized transmit signals 433 to analog signals 453 for propagation onto channel medium 101 by hybrid coupler and transformer circuit 403.

On the receive side, PHY 103 includes an analog-to-digital converter 463 configured to receive analog signals 473 from channel medium 101 via hybrid coupler and transformer circuit 403 and convert analog signals 473 to digitized received signals 483, and equalizer/decoder circuitry 493 to convert digitized received signals 483 to digital received bits 495 which are propagated to the functional circuit. Digital echo cancellation circuitry 497 is configured to detect in digitized received signals 483 any traces of digitized transmit signals 433 that may be present in digitized received signals 483 and to subtract out from digitized received signals 483 those traces of digitized transmit signals 433. Digital echo cancellation circuitry 497 may be supplemented by analog echo cancellation circuitry including a digital portion 420, which can be optimized to reduce the echo, and an echo DAC 421.

Link 100 thus may have one leg 301 operating in full-data mode via digital transmitter circuit 413, digital-to-analog converter (DAC) 433, hybrid coupler and transformer circuit 403, channel medium 101, hybrid coupler and transformer circuit 402, analog-to-digital converter 462 and equalizer/decoder circuitry 492. Link 100 may also have leg 302 operating in EEE mode. Leg 302 may include digital transmitter circuit 412, digital-to-analog converter (DAC) 432, hybrid coupler and transformer circuit 402, channel medium 101, hybrid coupler and transformer circuit 403, analog-to-digital converter 463 and equalizer/decoder circuitry 493. An EEE controller 404 (which may be a state machine) is configured to control the occurrence of refresh intervals 205 and alert/wake interval 206.

Figure 5:
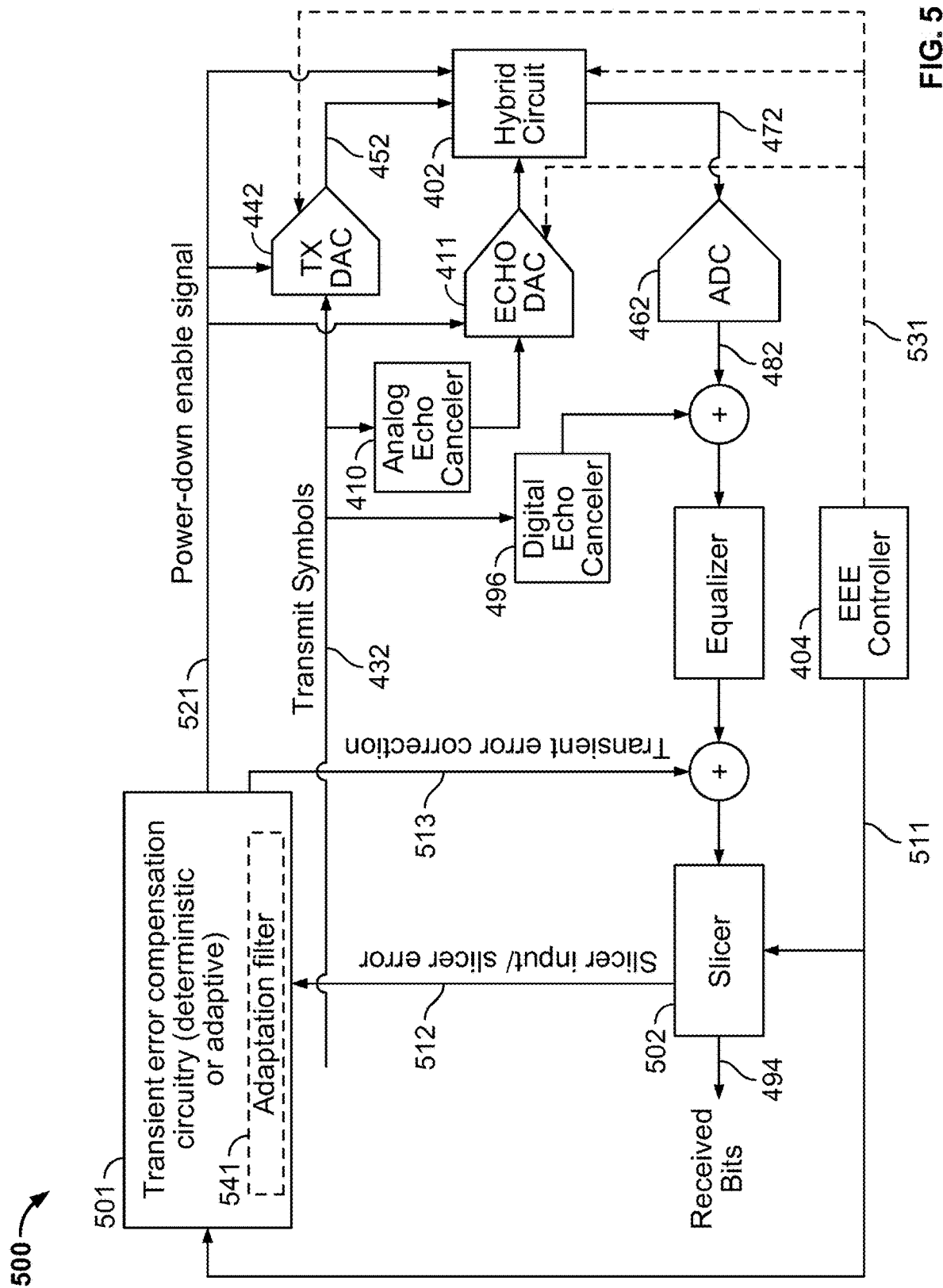
FIG. 5 is a schematic representation of a physical layer transceiver in accordance with implementations of the subject matter of this disclosure.

In accordance with implementations of the subject matter of this disclosure, PHY 500 of FIG. 5 may be an altered version of PHY 102 (and PHY 103 may be similarly altered to support leg 301 operating in EEE mode while leg 302 is in full-data mode) incorporating transient error compensation circuitry 501. Transient error compensation circuitry 501 may have one or both of two types of error compensation functions. A first type of error compensation function is the ability, based on knowledge of the periodic or predictable nature of certain transient interference signals (including the ability to receive from, e.g., a EEE controller, indications of the imminent occurrence of transient interference signals), to better detect such signals, and therefore to cancel errors causes by such signals. A second type of error compensation function is the ability to cancel transient errors caused by the activation or deactivation of analog components in one leg of link 100.

With regard to the first type of transient error compensation, transient error compensation circuitry 501 activates upon receipt of signals 511, from EEE controller 404, that indicate the transmit leg is in LPI mode. Slicer 502 in the receive path receives signals 511 from EEE controller or state machine 404 advising when a rising or falling edge 304, 305 of a refresh interval 205 is occurring Slicer 502 uses that information to detect errors 512 caused by transient signals from rising and falling edges 304, 305 of refresh intervals 205. Errors 512 are input to transient error compensation circuitry 501, which uses that information to subtract error correction 513 from digitized received signals 482.

With regard to the first type of transient error compensation, transient error compensation circuitry 501 can also cancel transient signals resulting from the activation and deactivation of analog components of altered PHYs 102, 103, such as DAC 442, 443, Echo DAC 411, 421, and portions of hybrid coupler and transformer circuit 402, 403. Therefore, when one of DACs 442, 443, Echo DACs 411, 421, and portions of one of hybrid coupler and transformer circuits 402, 403 are in a leg 301, 302 of link 100 that is operating in EEE LPI mode, those ones of DACs 442, 443, Echo DACs 411, 421, and portions of one of hybrid coupler and transformer circuits 402, 403 can be shut down. EEE controller or state machine 404 is configured to issue, as part of the entry into LPI mode, shutdown or power-down commands 531 to those ones of DACs 442, 443, Echo DACs 411, 421, and portions of hybrid coupler and transformer circuits 402, 403 located in the leg entering LPI mode. However, DACs 442, 443, Echo DACs 411, 421, and hybrid coupler and transformer circuits 402, 403 will not deactivate unless they also receive an "enable" signal 521 from transient error compensation circuitry 501, confirming that transient error compensation circuitry 501 is present and active to cancel any transient signal that would result from deactivation (or reactivation) of any one of DACs 442, 443, Echo DACs 411, 421, or portions of hybrid coupler and transformer circuits 402, 403.

Transient error compensation circuitry 501 may be deterministic. That is, the error signal 513 may be the same as the detected error 512 (with opposite sign. Alternatively, transient error compensation circuitry 501 may be adaptive. For example, transient error compensation circuitry may operate recursively, to reduce or remove residual error remaining after subtraction of the detected error signal 513. The residual error may arise from any number of causes, including, e.g., fluctuations based on temperature. Adaptation filter 541 of transient error compensation circuitry 501 may operate to minimize error power at slicer 502. For example, adaptation filter 541 may be based on a least-mean-squares (LMS) adaptation algorithm.

Although implementations of the subject matter of this disclosure have been described up to this point in the context of Energy-Efficient Ethernet, as noted above the subject matter of this disclosure may apply to situations, besides interference on an EEE leg caused by another EEE leg in LPI mode, where transient signals on one leg of a bidirectional network link may cause interference on another leg of the bidirectional network link. As one example of such a situation, if a filter in the PHY (even if not an EEE PHY) becomes saturated, it is predictable that the saturated filter will pass transient pulses. Thus, once the filter becomes saturated, the transient error compensation circuitry can be activated.

That is, implementations of the subject matter of this disclosure may include those in which a PHY includes transient error compensation circuitry that filters, from one data path, transient errors or interference caused signals in other data path, where the transient interference-causing signals may be predictable or where the timing of occurrence of such signals may be communicated to the PHY. As just two examples, as described above, in an EEE context, the period between refresh signals may be known, and in the case of a saturated filter, while no specific schedule may be predicted, it is sufficiently predictable for transient errors to occur that the transient error compensation circuitry should be activated. In addition, as also described above, such a PHY may be able to shut down certain components in a low-power path, to further save power without causing further transient errors as a result of the component shutdowns.

Figure 6:
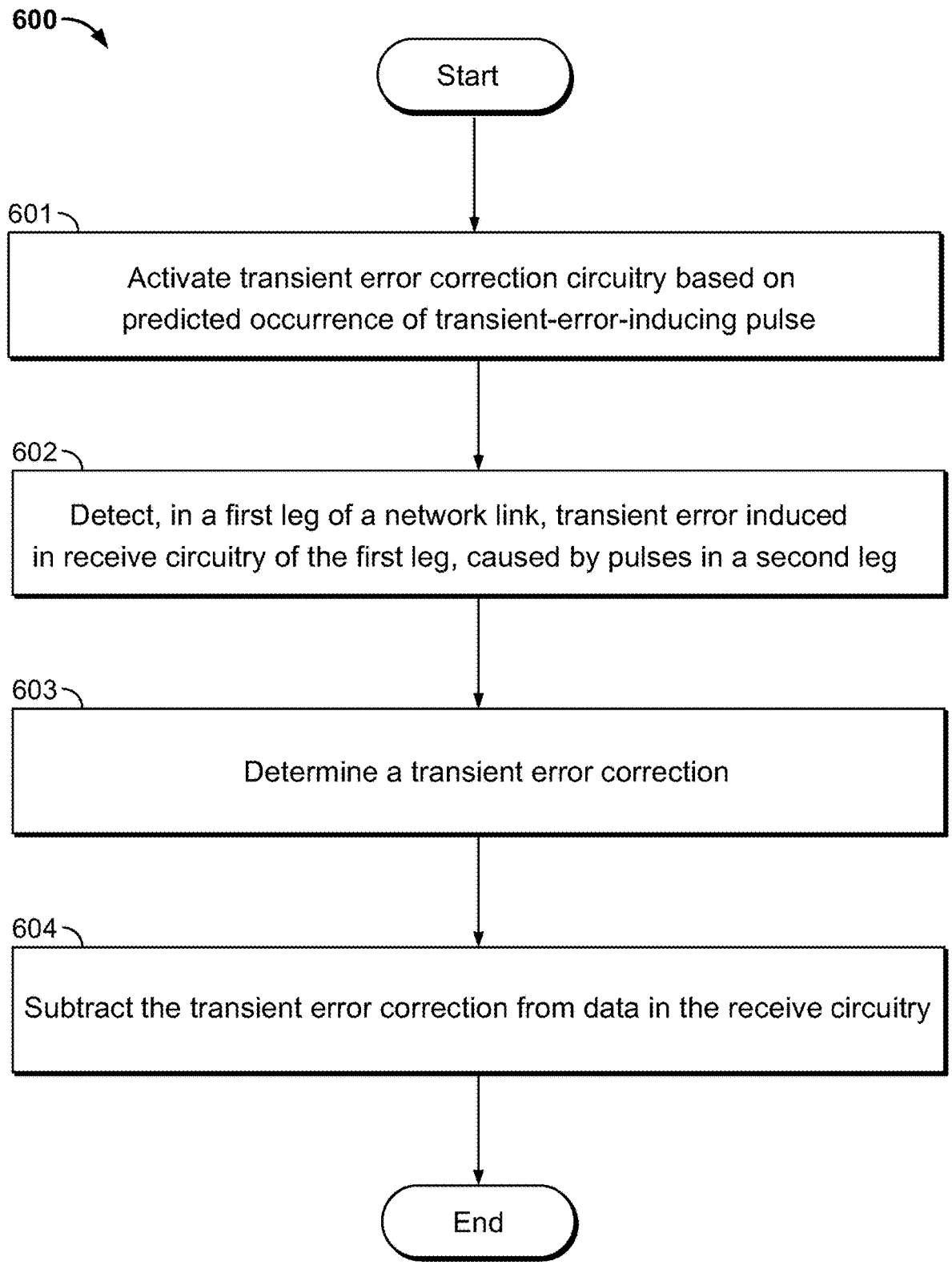
FIG. 6 is a flow diagram illustrating implementations of a method in accordance with the subject matter of this disclosure.

FIG. 6 is a flow diagram illustrating a method 600 in accordance with implementations of the subject matter of this disclosure for cancelling transient error in a first leg of a network link, such as a full-data-mode leg of an asymmetric Energy-Efficient Ethernet link, caused by pulses in a second leg of the network link, such as a low-power-idle mode leg of the asymmetric Energy-Efficient Ethernet link. Method 600 begins at 601 where transient error correction circuitry is activated based on the predicted occurrence of a transient-error-inducing pulse (which may be periodic or predictable). At 602, in a first leg of a network link, transient error induced in receive circuitry of the first leg, caused by pulses in the second leg, is detected. At 603, a transient error correction is determined. The determination at 603 may be made deterministically or adaptively as discussed above. At 604, the transient error correction is subtracted from data in the receive circuitry of the full-data mode leg. Method 600 then ends.

Thus it is seen that a physical layer transceiver having transient error compensation circuitry that filters periodic or predictable transient signals in one leg of a data channel, such as an asymmetric Energy-Efficient Ethernet channel, and also allows more complete shutdown of an EEE channel in low-power-idle mode, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver comprising:
   transmit circuitry including digital transmit portions and analog transmit portions;
   receive circuitry including digital receive portions and analog receive portions;
   coupling circuitry configured to couple transmit signals from the transmit circuitry onto a transmission medium, and to couple receive signals off the transmission medium to the receive circuitry; and
   transient error compensation circuitry coupled to the digital receive portions and to the analog transmit portions, and configured to detect transient error induced in the receive circuitry by the analog transmit portions and to subtract a transient error correction from data in the receive circuitry.

2. The physical layer transceiver of claim 1 further comprising:
   asymmetric Energy-Efficient Ethernet controller circuitry configured to operate a first one of the transmit circuitry and the receive circuitry in a low-power-idle mode while operating a second one of the transmit circuitry and the receive circuitry in a full-data mode, such that in a link with another such physical layer transceiver on the transmission medium, one leg of the link operates in full-data mode and another leg of the link operates in low-power-idle mode; wherein:
   the transient error compensation circuitry is coupled to the asymmetric Energy-Efficient Ethernet controller circuitry, to the digital receive portions and to the analog transmit portions, and is configured to, when the transmit circuitry is in the leg operating in low-power-idle mode, detect transient error induced in the receive circuitry of the leg operating in full-data mode and subtract a transient error correction from data in the receive circuitry.

3. The physical layer transceiver of claim 2 wherein the asymmetric Energy-Efficient Ethernet controller circuitry is configured to signal to the transient error compensation circuitry when a transient-error-inducing pulse occurs in the leg operating in low-power-idle mode.

4. The physical layer transceiver of claim 2 wherein the asymmetric Energy-Efficient Ethernet controller circuitry is configured to send a power-off command signal to the analog transmit portions when the transmit circuitry is in the leg operating in low-power-idle mode.

5. The physical layer transceiver of claim 4 wherein:
   the transient error compensation circuitry is configured to apply a power-off enable signal to the analog transmit portions; and
   the analog transmit portions are configured to power off in response to the power-off command signal only when also receiving the power-off enable signal.

6. The physical layer transceiver of claim 1 wherein the transient error correction is determined by the detected transient error.

7. The physical layer transceiver of claim 1 wherein determination of the transient error correction is adaptive.

8. The physical layer transceiver of claim 7 wherein determination of the transient error correction is based on minimizing error power on occurrence of the transient error.

9. The physical layer transceiver of claim 1 wherein the transient error compensation circuitry is configured to apply a power-off enable signal to the analog transmit portions.

10. A method, in a network link, of cancelling transient error in a first leg of the network link caused by pulses in a second leg of the network link, the method comprising:
    detecting transient error induced in receive circuitry of the first leg caused by transient pulses in the second leg; and
    subtracting a transient error correction from data in the receive circuitry.

11. The method of cancelling transient error according to claim 10, further comprising, when the network link is an asymmetric Energy-Efficient Ethernet link controlled by controller circuitry, the first leg is a full-data-mode leg of the asymmetric Energy-Efficient Ethernet link, and the second leg is operating in low-power-idle mode, signaling by the controller circuitry that a transient-error-inducing pulse is occurring, to enable the detecting of the transient error.

12. The method of cancelling transient error according to claim 11 further comprising powering off analog transmit portions of the leg operating in low-power-idle mode.

13. The method of cancelling transient error according to claim 10 further comprising determining the transient error correction from the detected transient error.

14. The method of cancelling transient error according to claim 10 further comprising determining the transient error correction adaptively.

15. The method of cancelling transient error according to claim 14 wherein determining the transient error correction adaptively comprises minimizing error power on occurrence of the transient error.

16. The method of cancelling transient error according to claim 10 further comprising powering off analog transmit portions of the second leg.

17. The method of cancelling transient error according to claim 16 wherein powering off analog transmit portions of the leg operating in low-power-idle mode is performed only when transient error compensation circuitry is present.

18. A network link comprising:
a transmission medium;
a first physical layer transceiver at a first end of the transmission medium, the first physical layer transceiver comprising:
first transmit circuitry including first digital transmit portions and first analog transmit portions,
first receive circuitry including first digital receive portions and first analog receive portions,
first coupling circuitry configured to couple first transmit signals from the first transmit circuitry onto the transmission medium, and to couple first receive signals off the transmission medium to the first receive circuitry, and
first transient error compensation circuitry coupled to the first digital receive portions and to the first analog transmit portions, and configured to detect a first transient error induced in the first receive circuitry and subtract a first transient error correction from data in the first receive circuitry; and
a second physical layer transceiver at a second end of the transmission medium, the second physical layer transceiver comprising:
second transmit circuitry including second digital transmit portions and second analog transmit portions,
second receive circuitry including second digital receive portions and second analog receive portions,
second coupling circuitry configured to couple second transmit signals from the second transmit circuitry onto the transmission medium, and to couple second receive signals off the transmission medium to the second receive circuitry, and
second transient error compensation circuitry coupled to the second digital receive portions and to the second analog transmit portions, and configured to detect a second transient error induced in the second receive circuitry of the leg operating in full-data mode and subtract a second transient error correction from data in the second receive circuitry.

19. The network link of claim 18 wherein:
the network link is an Energy-Efficient Ethernet link;
the first physical layer transceiver further comprises first asymmetric Energy-Efficient Ethernet controller circuitry configured to operate one of (a) the first transmit circuitry, and (b) the first receive circuitry, in a low-power-idle mode while operating another one of (a) the first transmit circuitry, and (b) the first receive circuitry, in a full-data mode;
the second physical layer transceiver further comprises second asymmetric Energy-Efficient Ethernet controller circuitry configured to operate one of (i) the second transmit circuitry, and (ii) the second receive circuitry, in a low-power-idle mode while operating another one of (i) the second transmit circuitry, and (ii) the second receive circuitry, in a full-data mode; and
the second error compensation circuitry is coupled to second asymmetric Energy-Efficient Ethernet controller circuitry configured to operate one of (i) the second receive circuitry, and (ii) the second transmit circuitry, in the low-power-idle mode while operating another one of (i) the second receive circuitry, and (ii) the second transmit circuitry, in the full-data mode;
wherein:
one leg of the Energy-Efficient Ethernet link on the transmission medium between the first physical layer transceiver and the second physical layer transceiver operates in full-data mode and another leg of the link operates in low-power-idle mode.

20. The network link of claim 19 wherein:
the first asymmetric Energy-Efficient Ethernet controller circuitry is configured to signal to the first transient error compensation circuitry when a transient-error-inducing pulse occurs in the first transmit circuitry in the leg operating in low-power-idle mode; and
the second asymmetric Energy-Efficient Ethernet controller circuitry is configured to signal to the second transient error compensation circuitry when a transient-error-inducing pulse occurs in the second transmit circuitry in the leg operating in low-power-idle mode.

21. The network link of claim 19 wherein:
the first asymmetric Energy-Efficient Ethernet controller circuitry is configured to send a power-off command signal to the first analog transmit portions when the first transmit circuitry is in the leg operating in low-power-idle mode; and
the second asymmetric Energy-Efficient Ethernet controller circuitry is configured to send a power-off command signal to the second analog transmit portions when the second transmit circuitry is in the leg operating in low-power-idle mode.

22. The network link of claim 21 wherein:
the first transient error compensation circuitry is configured to apply a power-off enable signal to the first analog transmit portions;
the first analog transmit portions are configured to power off in response to the power-off command signal only when also receiving the power-down enable signal;
the second transient error compensation circuitry is configured to apply a power-off enable signal to the second analog transmit portions; and
the second analog transmit portions are configured to power off in response to the power-off command signal only when also receiving the power-down enable signal.

23. The network link of claim 18 wherein the transient error correction is determined by the detected transient error.

24. The network link of claim 18 wherein determination of the transient error correction is adaptive.

25. The network link of claim 24 wherein determination of the transient error correction is based on minimizing error power on occurrence of the transient error.

26. The network link of claim 18 wherein:
the first transient error compensation circuitry is configured to apply a power-off signal to the first analog transmit portions; and
the second transient error compensation circuitry is configured to apply a power-off signal to the second analog transmit portions.

\* \* \* \* \*